US012572353B2

(12) United States Patent
Rajagopalan et al.

(10) Patent No.: US 12,572,353 B2
(45) Date of Patent: Mar. 10, 2026

(54) SYSTEM AND METHOD FOR GENERATING A MODERNIZATION SEQUENCE FOR APPLICATION MODERNIZATION

(71) Applicant: Cognizant Technology Solutions India Pvt. Ltd., Chennai (IN)

(72) Inventors: Madhu Rajagopalan, Chennai (IN); Surendranathan Ardhanari, Chennai (IN); Senthilkumar Chinnusamy, Coimbatore (IN); Trichur Krishnan Narayanan, Chennai (IN)

(73) Assignee: COGNIZANT TECHNOLOGY SOLUTIONS INDIA PVT. LTD., Chennai (IN)

( * ) Notice: Subject to any disclaimer, the term of this patent is extended or adjusted under 35 U.S.C. 154(b) by 311 days.

(21) Appl. No.: 18/224,448

(22) Filed: Jul. 20, 2023

(65) Prior Publication Data

US 2024/0281247 A1      Aug. 22, 2024

(30) Foreign Application Priority Data

Feb. 20, 2023     (IN) .............................. 202341011443

(51) Int. Cl.
　　　*G06F 8/72*　　　　(2018.01)
　　　*G06F 8/65*　　　　(2018.01)
(52) U.S. Cl.
　　　CPC . *G06F 8/72* (2013.01); *G06F 8/65* (2013.01)
(58) Field of Classification Search
　　　CPC ..................................... G06F 8/72; G06F 8/65
　　　See application file for complete search history.

(56) References Cited

U.S. PATENT DOCUMENTS

| | | |
|---|---|---|
| 8,010,962 B2 | 8/2011 | Tal et al. |
| 11,354,120 B1 * | 6/2022 | Zhang ....................... G06F 8/72 |
| 11,467,828 B1 | 10/2022 | Zhang et al. |

(Continued)

FOREIGN PATENT DOCUMENTS

EP　　　　3226155 A1　　10/2017

OTHER PUBLICATIONS

Seacord et al., "Legacy System Modernization Strategies" (Year: 2001).*

(Continued)

*Primary Examiner* — Phillip H Nguyen
(74) *Attorney, Agent, or Firm* — Troutman Pepper Locke LLP

(57)　　　　　　ABSTRACT

A system and method for generating a modernization sequence for application modernization is provided. The present invention provides for generating a database of hierarchies between a plurality of technology stacks based on analysis of historic modernization data and user inputs. Further, the present invention provides for evaluating in real-time an optimal sequence for implementing modernization of two or more technologies associated with the application based on the database. A hierarchy between each of the technology stacks corresponding to the two or more technologies is derived based on the database, and the technology stacks are arranged in a chronological order based on the derived hierarchy. The modernization sequence of the two or more technologies is same as the chronological order of their corresponding technology stacks.

19 Claims, 4 Drawing Sheets

(56)                References Cited

U.S. PATENT DOCUMENTS

| | | | | |
|---|---|---|---|---|
| 11,620,128 B1* | 4/2023 | Chawda | .................... | G06F 8/75 |
| | | | | 717/120 |
| 2015/0019488 A1 | 1/2015 | Hggnson et al. | | |
| 2015/0020059 A1 | 1/2015 | Davis | | |
| 2021/0349711 A1* | 11/2021 | Kandel | ...................... | G06F 8/38 |
| 2022/0138617 A1* | 5/2022 | Xiao | ......................... | G06F 9/50 |
| | | | | 706/12 |
| 2023/0015802 A1* | 1/2023 | Bhattacharya | .......... | G06F 8/658 |

OTHER PUBLICATIONS

IBM: What is Cloud Migration? (Published Apr. 12, 2019) https://www.ibm.com/cloud/learn/cloud-migration.
Rackware: Netflix's Cloud Migration (Published Apr. 18, 2019) https://www.rackwareinc.com/netflixs-cloud-migration.
Neal Analytics: Migrate, modernize, and innovate in the cloud (Published May 14, 2020) https://nealanalytics.com/expertise/migration-modernization/.
Digital/McKinsey Insights: Creating value with the cloud (Published Dec. 15, 2018) https://www.mckinsey.com/~/media/McKinsey/Business%20Functions/McKinsey%20Digital/Our%20Insights/Creating%20value%20with%20the%20cloud%20compendium/Creating-value-with-the-cloud.ashx.
Cloud Standards Customer Council: Migrating Applications to Public Cloud Services: Roadmap for Success, Version 2.0 (Published Feb. 23, 2018) https://www.org.org/cloud/deliverables/CSCC-Migrating-Applications-to-Public-Cloud-Services-Roadmap-for-Success.pdf.

Creole Studios: A Complete Guide on Technology Migration Strategies: Part 1—Introduction (Published Dec. 22, 2020) https://www.creolestudios.com/a-complete-guide-on-technology-migration-strategies-part-1-introduction/.
Applandeo: Technology stack migration services (Published Aug. 17, 2020) https://applandeo.com/services/technology-stack-migration-services/.
Dell Inc. An Application-Centric Approach To Data Center Migration (Published Aug. 19, 2019) https://www.delltechnologies.com/asset/en-in/services/consulting/industry-market/h6151-ep-application-centric-approach-to-data-center-migration.pdf.
Federal Student Aid, an Office of the Department of Education: Data Migration Roadmap Guidance, Version 3.2, Final (Published Jul. 9, 2010) https://studentaid.gov/sites/default/files/fsawg/static/gw/docs/ciolibrary/Data_Migration_Roadmap_Guidance.pdf.
Deloitte: At-scale migration | Five lessons for success (Published Oct. 19, 2019) https://www2.deloitte.com/content/dam/Deloitte/us/Documents/technology/us-five-lessons-for-success.pdf.
Wong, et al, Google: To the cloud and beyond! Planning a multi-year data center migration (Published Feb. 18, 2021) https://cloud.google.com/blog/products/cloud-migration/planning-a-multi-year-data-center-migration.
TCS Cloud Migration Services for Seamless Digital transformation (Published Jun. 18, 2021) https://www.tcs.com/what-we-do/services/cloud/google/solution/cloud-migration-services-digital-transformation-modernization-journey.
ScienceSoft: Application Migration Services (Published Jun. 20, 2022) https://www.sonsoft.com/application/migration.

* cited by examiner

100

Input

Communication
Channel 108

Sequence Generation System 106

Sequence Generation Engine 110

Interface Unit 118

Data Analysis
Unit 120

Sequence
Computation Unit
124

Hierarchy Database
122

Memory
112

Processor
114

I/O Device
116

100

SYSTEM AND METHOD FOR GENERATING A MODERNIZATION SEQUENCE FOR APPLICATION MODERNIZATION

CROSS-REFERENCE TO RELATED APPLICATION

This application claims priority to Indian Patent Application No. 202341011443, filed on Feb. 20, 2023, which is hereby incorporated by reference in its entirety.

TECHNICAL FIELD

The present invention relates generally to the field of application modernization. More particularly, the present invention relates to a system and a method for generating an optimal sequence for implementing modernization of multiple technologies associated with an application, thereby increasing modernization efficiency and decreasing the time required for modernization.

BACKGROUND

With new technology evolving every day, many of the software applications built on old technologies are becoming obsolete. As a result, it has become imperative for the software manufacturers/developers to modernize or upgrade the technology associated with old software applications, to meet one or more end-user requirements or expectations and also to improve software application's efficiency. Application modernization is one such technique that enables the upgrading or modernizing of applications with newer computing technologies, including, but not limited to newer programing languages, operating systems, frameworks, and infrastructure platforms.

Existing methods used for application modernization provide multiple technologies and one or more solutions for implementing modernization of respective technologies using technology stacks corresponding to the technologies. The technologies with which any application may be upgraded is usually selected based on an analysis of new functionalities that are to be added to the application. For example, assuming database migration, operating system, programming language, middleware, run time, file system etc. are a few of the multiple technologies associated with an application, then the modernization of each of the aforementioned technologies is implemented using respective solutions and technology stack corresponding to the technology. For instance, modernization of operating system (OS) technology is achieved using OS technology stack including plurality of OS options, such as Windows®, Linux®, Unix®, etc. Similarly, modernization of programming language is achieved using programming language stack, including a plurality of programming languages, such as .NET®, JAVA®, COBOL®, etc. and similarly for other technologies their corresponding technology stack is used.

While modernization of single technology associated with any application can be readily achieved using existing methods, complexity arises when modernization on multiple technologies associated with an application is envisioned. As the technologies associated with an application are linked to an extent, therefore modernization of one technology prior to another, or vice-versa causes the aforementioned complexity, such as incompatibility between the modernized technologies. Accordingly, evaluation of a sequence for implementing modernization of technologies is essential whenever two or more technologies are identified or selected for modernization. For example, assuming that the application is to be primarily modernized from a monolithic architecture to a micro service architecture, and as a result the OS and the programming language of the application are also to be modernized to an OS and programming language that support micro service architecture. In the aforementioned scenario, application architecture, programming language and Operating System are the three technologies identified for modernization. However, performing programming language upgrade prior to operating system upgrade mostly likely causes complexities that are time consuming to remove and uneconomical, such as the OS might not be compatible with the new programming language, as a result the OS is upgraded and then again the programming language is upgraded to make it compatible with the new OS, causing rework and time wastage. Similarly, performing architecture upgrade prior to operating system upgrade or the programming language upgrade most likely provides micro services that are incompatible with the existing OS and programming language.

Generally, evaluation of modernization sequence is a manual process, thereby making the existing modernization tools dependent on human intervention, further reducing the efficiency of application modernization. Further, the existing approach of evaluating modernization sequence requires involvement of various solution architects, each responsible for respective technologies that are to modernized, thereby leading to excessive time consumption and errors. Furthermore, the modernization sequence evaluated manually must be revisited by all the involved solution architects each time a change is made to the selection of technologies that are to be modernization. Yet further, the existing approach for evaluating modernization sequence is costly and requires a lot of effort.

In light of the above drawbacks, there is a need for a system and a method that can readily generate a sequence for implementing modernization of multiple technologies associated with an application. There is need for a system and a method, which dynamically updates the modernization sequence each time one or more technologies selected for modernization are added or removed from the selection. Further, there is a need for a system and a method that can automatically generate a modernization sequence for any combination of technologies selected for modernization, thereby eliminating the need of a user to have any technical expertise related to modernization sequence. Yet further, there is a need for a system and a method that minimizes manual intervention. Yet further, there is a need for a system which is accurate and economical. Yet further, there is a need for a system and a method which enables any of the exiting application modernization tools to automatically evaluate modernization sequence of the technologies.

SUMMARY

In various embodiments of the present invention, a method for generating an optimal sequence for implementing modernization of technologies associated with an application is provided. The method is implemented by a processor executing program instructions stored in a memory. The method comprises generating, by the processor, a database of hierarchies between a plurality of technology stacks based on analysis of historic modernization data and user inputs. Further, the method comprises evaluating, by the processor, in real-time an optimal sequence for implementing modernization of two or more technologies associated with the application based on the database. A hierarchy between each of the technology stacks corresponding to the two or more technologies is derived based on the database, and the technology stacks are arranged in a chronological order based on the derived hierarchy. The modernization sequence of the two or more technologies is same as the chronological order of their corresponding technology stacks.

In various embodiments of the present invention, a system for generating an optimal sequence for implementing modernization of technologies associated with an application is provided. The system comprises a memory storing program instructions; a processor configured to execute program instructions stored in the memory; and a sequence generation engine executed by the processor. The sequence generation engine is configured to generate a database of hierarchies between a plurality of technology stacks based on analysis of historic modernization data and user inputs. Further, the sequence generation engine is configured to evaluate in real-time an optimal sequence for implementing modernization of two or more technologies associated with the application based on the database. A hierarchy between each of the technology stacks corresponding to the two or more technologies is derived based on the database, and the technology stacks are arranged in a chronological order based on the derived hierarchy. The modernization sequence of the two or more technologies is same as the chronological order of their corresponding technology stacks.

In various embodiments of the present invention, a computer program product is provided. The computer program product comprising a non-transitory computer-readable medium having computer-readable program code stored thereon, the computer-readable program code comprising instructions that, when executed by a processor, causes the processor to generate a database of hierarchies between a plurality of technology stacks based on analysis of historic modernization data and user inputs. Further, an optimal sequence for implementing modernization of two or more technologies associated with the application based on the database is evaluated in real-time. A hierarchy between each of the technology stacks corresponding to the two or more technologies is derived based on the database, and the technology stacks are arranged in a chronological order based on the derived hierarchy. The modernization sequence of the two or more technologies is same as the chronological order of their corresponding technology stacks.

BRIEF DESCRIPTION OF THE DRAWINGS

The present invention is described by way of embodiments illustrated in the accompanying drawings wherein.

DETAILED DESCRIPTION OF THE EMBODIMENTS

Figure 1:
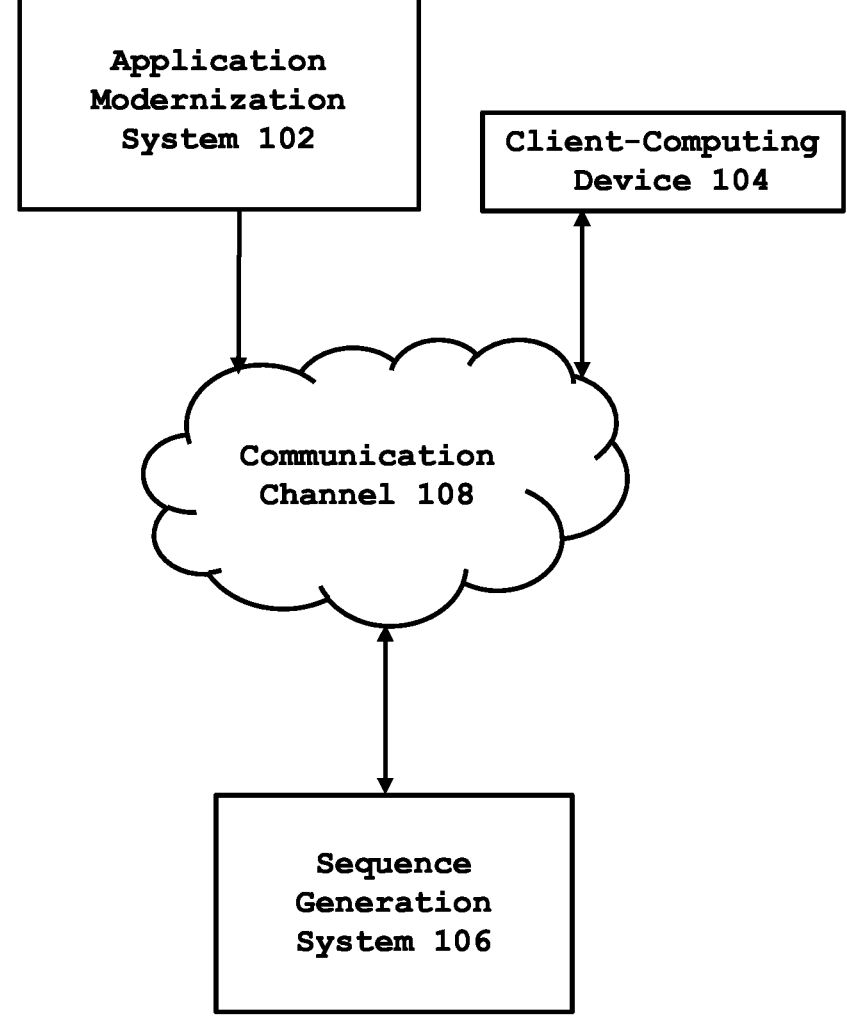
FIG. 1 is a block diagram of a computing environment including a system for generating a modernization sequence for application modernization, in accordance with various embodiments of the present invention.

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the scope of the invention. The terminology and phraseology used herein is for the purpose of describing exemplary embodiments and should not be considered limiting. Thus, the present invention is to be accorded the widest scope encompassing numerous alternatives, modifications, and equivalents consistent with the principles and features disclosed herein. For purposes of clarity, details relating to technical material that is known in the technical fields related to the invention have been briefly described or omitted so as not to unnecessarily obscure the present invention. The term "legacy applications" as used in the specification refers to obsolete applications built using old technologies or outdated application technologies. The phrase "technologies associated with application" refers to the technologies, including, but not limited to operating systems, programming languages, run time, databases, authentication, middleware, file system etc. that form the application to perform one or more functionalities. The term "technology stack" as used in the specification refers to a combination of corresponding technologies, such as a combination of operating systems, including, but not limited to Windows®, Linux, Unix®, etc.; combination of programming languages, such as .NET®, Java®, COBAL®, C, C++, etc.; combination databases, such as My SQL, Oracle etc. and combination of other technologies used to build, deploy, and maintain any application. The terms "tech stacks" and "technology stacks" have been used interchangeably. The term "modernization sequence" as used in the specification refers to a sequence for implementing modernization of multiple technologies associated with an application.

The present invention discloses a system and a method for generating a modernization sequence for application modernization. In particular, the present invention, discloses a system and a method for generating an optimal sequence for implementing modernization of multiple technologies associated with an application, thereby reducing rework, decreasing the time required for modernization, and increasing modernization efficiency. In operation, the present invention provides for generating a database comprising hierarchies between a plurality of technology stacks based on analysis of historic modernization data and/or user inputs. The hierarchies include predecessor, successor and sibling levels between each tech stack in relation to other of the plurality of tech stacks. The plurality of technology stacks are the stacks most commonly used for building, deploying and maintaining most of the applications. For example: assuming A, B, C, D, E are 5 technology stacks, A is predecessor of B, accordingly, B is the successor of A; D is predecessor of A, accordingly A is successor of D; B and C are siblings, where sibling represents same level, therefore A is predecessor of C as well and D is predecessor of A, B and C; A is predecessor of E, accordingly E is successor of A; however, D is predecessor of A, and A is predecessor of E, accordingly E is successor of D. The present invention further provides for evaluating in real-time a sequence for implementing modernization of two or more technologies of an application selected for modernization based on the generated database. Evaluating the modernization sequence based on the database comprises deriving the hierarchy between each of tech stacks corresponding to respective two or more technologies selected for modernization and arranging said tech stacks based on the derived hierarchy in a chronological order, where the modernization sequence of the two or more technologies selected for modernization is same as the chronological order of their corresponding tech stacks.

The present invention would now be discussed in context of embodiments as illustrated in the accompanying drawings.

Referring to FIG. 1, a block diagram of a computing environment including a system for generating a modernization sequence for application modernization is illustrated. In an embodiment of the present invention the computing environment 100 includes an application modernization system 102, a client-computing device 104 and a system for generating a modernization sequence for application modernization, hereinafter referred to as a sequence generation system 106.

In accordance with various embodiments of the present invention, the application modernization system 102 is platform capable of offering application modernization. In accordance with various embodiments of the present invention, the application modernization system 102 may be a software executable by any computing device or a combination of software and hardware. Examples of a computing device may include, but are not limited to, general-purpose computer, such as a desktop, a laptop, or a server computer; a supercomputer; a microcomputer; a virtual computer or any other device capable of executing instructions, connecting to a network, and sending and receiving data. In accordance with various embodiments of the present invention, the application modernization system 102 is configured to provide resources and solutions for modernizing software applications. In an embodiment of the present invention, the application modernization system 102 includes a combination of a plurality of technology stacks required for building, deploying, and maintaining most of the modern software applications. Further, the application modernization system 102 is configured with one or more solutions for implementing modernization of respective technologies associated with any application (selected for modernization) using the technology stacks corresponding to the technologies.

In an embodiment of the present invention, the application modernization system 102 interfaces with the sequence generation system 106 to receive a modernization sequence for implementing modernization of two or more technologies associated with an application. In an embodiment of the present invention, the application modernization system 102 interfaces with the sequence generation system 106 via a communication channel 108. Examples of the communication channel 108 may include, but are not limited to, an interface such as a software interface, a physical transmission medium such as a wire, or a logical connection over a multiplexed medium such as a radio channel in telecommunications and computer networking. Examples of radio channel in telecommunications and computer networking may include, but are not limited to, a Local Area Network (LAN), a Metropolitan Area Network (MAN), and a Wide Area Network (WAN).

In accordance with various embodiments of the present invention, the client-computing device 104 is any device used by an end-user to receive modernization sequence for application modernization. In accordance with various embodiments of the present invention, the client-computing device 104 may be selected from a general-purpose computer, such as a desktop, a laptop, a smartphone, and a tablet; a supercomputer; a microcomputer or any device capable of executing instructions, connecting to a network, and sending/receiving data. In an embodiment of the present invention, the client-computing device 104 interfaces with sequence generation system 106 via the communication channel 108 to receive a modernization sequence for modernizing two or more technologies associated with an application. In an embodiment of the present invention, a user module of the sequence generation system 106 may be installed onto the client-computing device 104 to access the sequence generation system 106 via the communication channel 108. In an embodiment of the present invention, the client-computing device 106 is configured to transmit a query including two or more technologies for modernization to the sequence generation system 106.

Figure 1A:
FIG. 1A illustrates a detailed block diagram of a system for generating a modernization sequence for application modernization, in accordance with various embodiments of the present invention.

In accordance with various embodiments of the present invention, the sequence generation system 106 may be a software executable by any computing device or a combination of software and hardware. In an embodiment of the present invention, the computing device (not shown) may be selected from a general-purpose computer, such as a desktop, a laptop, a smartphone, and a tablet; a supercomputer; a microcomputer, a server, or any device capable of executing instructions, connecting to a network and sending/receiving data. In an embodiment of the present invention as shown in FIG. 1 and FIG. 1A, the sequence generation system 106 is a combination of software and hardware. In an embodiment of the present invention, the sequence generation system 106 may be implemented using a client-server architecture, wherein the application modernization system 102 and/or the client-computing device 104 or any other computing device (not shown) accesses a server hosting the sequence generation system 106 via the communication channel 108. In another embodiment of the present invention, the sequence generation system 106 may be implemented in a cloud computing architecture in which data, applications, services, and other resources are stored and delivered through shared datacenters. In an exemplary embodiment of the present invention, the functionalities of the sequence generation system 106 are delivered as Software as a Service (SAAS) to the application modernization system 102 and/or one or more client-computing devices 104. In an exemplary embodiment of the present invention, the sequence generation system 106 is a remote resource implemented over the cloud and accessible for shared usage in a distributed computing architecture by multiple application modernization systems 102 and multiple client-computing devices 104. In an exemplary embodiment of the present invention, the sequence generation system 106 may be accessed via an IP address/domain name. In another exemplary embodiment of the present invention, the sequence generation system 106 may be accessed via a user module of the sequence generation system 106 executable on the client-computing device 104. In an embodiment of the present invention, the user module is configured with a Graphical User Interface (GUI) to access the sequence generation system 106 and receive a modernization sequence.

In accordance with various embodiments of the present invention, the sequence generation system 106 is configured to interface with the application modernization system 102, and the client-computing device 104. In an embodiment of the present invention, the sequence generation system 106 is configured to receive modernization sequence generation requests and/or inputs from the application modernization system 102 and/or the client-computing device 104. In an embodiment of the present invention, the sequence generation requests include the technologies selected for modernization and/or the solutions for implementing the modernization of the selected technologies, and the minimum architecture constraints associated with modernization of the selected technologies.

Referring to FIG. 1A a detailed block diagram of a system for generating a modernization sequence for application modernization is illustrated. In an embodiment of the present invention, the sequence generation system 106 comprises a sequence generation engine 110, a memory 112, a processor 114 and an Input/Output (I/O) device 116. The sequence generation engine 110 is operated via the processor 114 specifically programmed to execute instructions stored in the memory 112 for executing functionalities of the sequence generation engine 110. In accordance with various embodiments of the present invention, the memory 112 may be a Random-Access Memory (RAM), a Read-only memory (ROM), a Hard Drive Disk (HDD) or any other memory capable of storing data and instructions. Examples of the I/O device 116 may include, but are not limited to, keyboard, mouse, display, a touch screen display, and any other device capable of receiving inputs and outputting results.

In accordance with various embodiments of the present invention, the sequence generation engine 110 is a self-learning engine configured to retrieve/receive complex historical data related to modernization sequence of various technologies associated with various applications and/or user inputs including hierarchies between a plurality of technology stacks, build a database comprising hierarchies between a plurality of technology stacks based on an analysis of said data and/or inputs, receive information on the technologies of an application to be modernized and/or solutions for implementing the modernization of the selected technologies, evaluate a sequence for implementing modernization of said technologies based on the generated database, and provide recommendations associated with technologies that may be removed from the sequence.

In accordance with various embodiments of the present invention, the sequence generation engine 110 comprises an interface unit 118, a data analysis unit 120, a hierarchy database 122 and a sequence computation unit 124. The various units of the sequence generation engine 110 are operated via the processor 114 specifically programmed to execute instructions stored in the memory 112 for executing respective functionalities of the multiple units (118, 120, 122, and 124) in accordance with various embodiments of the present invention.

In accordance with various embodiments of the present invention, the interface unit 118 is configured to facilitate communication with the application modernization system 102, the client-computing device 104, the I/O device 116 and any other external resource (not shown). Examples of external resource may include, but are not limited to, storage devices, and third-party systems such as computing resources, databases etc.

In an embodiment of the present invention, interface unit 118 is configured to provide communication with the application modernization system 102 and the client-computing device 104 to receive modernization sequence generation requests and other inputs. In an embodiment of the present invention, the sequence generation requests include the technologies selected for modernization and/or the solutions for implementing the modernization of the selected technologies, and the minimum architecture constraints associated with modernization of the selected technologies. In an embodiment of the present invention, the interface unit 118 is configured to provide communication with the I/O device 116 associated with the sequence generation system 106 for receiving inputs from the system admins and updating system configurations.

In an embodiment of the present invention, the interface unit 118 is configured with any of the following: a web gateway, a mobile gateway, a Graphical User Interface (GUI), an integration interface, a configuration interface, and a combination thereof to facilitate interfacing with the application modernization system 102, the client-computing device 104, the I/O device 116 and other external resource (not shown).

In an embodiment of the present invention, the Graphical User Interface (GUI) is accessible on the client-computing device 104 and/or the I/O device 116 to facilitate user interaction. The GUI allows a user to at least: create login credentials, sign-in using the login credentials, input technologies for modernization, input technology stack hierarchy, and receive modernization sequence amongst other things. In an embodiment of the present invention, the graphical user interface (GUI) may be accessed from the client-computing device 104 through a web gateway via a web browser. In another embodiment of the present invention, the GUI may be accessed by mobile gateway using a user module installable on the client-computing device 104. In an embodiment of the present invention, the integration interface is configured with one or more APIs, such as REST and SOAP APIs to facilitate smooth interfacing and/or integration with the application modernization system 102, external resource (not shown) and any other computing device (not shown). In an embodiment of the present invention, the configuration interface provides communication with the I/O device 116 for receiving, updating, and modifying administration configurations from system admins, and receiving other data.

In accordance with various embodiments of the present invention, the data analysis unit 120 is configured to generate a hierarchy database 122 comprising hierarchies between a plurality of technology stacks. The plurality of technology stacks are the stacks most used for building, deploying, and maintaining most of the applications. For example, OS technology stack includes plurality of OS versions, such as Windows®, Linux®, Unix®, etc.; programming language stack, includes a plurality of programming languages, such as .NET®, JAVAR, COBOL®, etc.; database stack includes a plurality of databases, such as MySQL, SQL Server, MongoDB, Oracle Database, PostgreSQL, Informix, Sybase, etc.; middleware stack includes a plurality of middleware; run time stack; file system stack, etc. In an embodiment of the present invention, the hierarchies include predecessor, successor, and sibling levels between each tech stack in relation to other of the plurality of tech stacks. The hierarchy level predecessor is representative that the tech stack marked as predecessor should be implemented prior to the other tech stack being compared with. The hierarchy level successor is representative that the tech stack marked as successor should be implemented after the other tech stack being compared with. The hierarchy level sibling is indicative that the tech stacks being compared are at the same level and may be implemented in any sequence.

In accordance with various embodiments of the present invention, the data analysis unit 120 is configured to generate a hierarchy database 122 comprising hierarchies between a plurality of technology stacks based on analysis of historic modernization data or user inputs or a combination thereof. In operation, the data analysis unit 120 is configured to retrieve historical data from external resources (not shown), such as a storage via the interface unit 118. In an embodiment of the present invention, the historical data is related to modernization sequence used for implementing modernization of various technologies associated with various applications in the past. The data analysis unit is configured to analyze the historical data using one or more data analysis techniques and extract a plurality of sequences related to implementation of modernization of various technologies. Further, the data analysis unit 120 is configured to identify hierarchies between a plurality of technology stacks corresponding to the various technologies based on the extracted sequences. Yet further, the data analysis unit is configured to generate a hierarchy database 122 comprising the identified hierarchies between a plurality of technology stacks. For example: assuming A, B, C, D, E are 5 technology stacks, A is identified as predecessor of B, accordingly, B is the successor of A; D is identified as predecessor of A, accordingly A is successor of D; B and C are identified as siblings, therefore A is identified as predecessor of C, and D is identified as predecessor of A, B and C; A is identified as predecessor of E, accordingly E is successor of A; however, D is identified as predecessor of A, and A is predecessor of E, accordingly E is identified as successor of D.

In an embodiment of the present invention, the data analysis unit 120 is configured to validate the identified hierarchies based on user inputs and modify the hierarchies if required. In another embodiment of the present invention, the data analysis unit 120 is configured to generate a hierarchy database 122 based on user inputs that define hierarchies between a plurality of technology stacks.

In accordance with various embodiments of the present invention, the sequence computation unit 124 is configured to evaluate in real-time a sequence for implementing modernization of two or more technologies of an application selected for modernization based on the generated hierarchy database 122. In operation, the sequence computation unit 124 is configured to receive a modernization request (also referred to as modernization query). In an embodiment of the present invention, the modernization request is received from application modernization system 102 and/or the client computing device 104. In an embodiment of the present invention, each modernization request includes information associated with two or more technologies for modernization. The information may include, but is not limited to, name/ technical character of the two or more technologies to be modernized or the solutions for implementing the modernization of the two or more technologies, and minimum architecture constraints associated with modernization of the selected two or more technologies. In an embodiment of the present invention, where the information associated with two or more technologies selected for modernization includes the solutions for implementing modernization, therein the name/character of the technologies to be modernized is extracted from the solutions. In an embodiment of the preset invention, sequence order, predecessor, and successor information of the technology stacks are employed to generate the modernization sequence. In an exemplary embodiment of the present invention, two technology stacks may not be compatible, however they may have a predecessor, and successor dependency during modernization, which is carried out based on modernization sequence. In an example, there is no compatibility between the tech stack 'database' and 'scheduler'. However, the sequence computation unit 124 configured to determine that database and programming language migration changes must be completed before scheduler related changes or implementation is carried out. In an exemplary embodiment of the present invention, the sequence computation unit 124 is configured to receive the modernization request comprising a list of selected technology stacks for a Modernization Acceleration Kit (MAK) along with configuration of minimum architecture constraints required for modernization of technologies. A check is performed by the sequence computation unit 124 for determining missing essential technology stacks. The missing technology stacks are identified by the sequence unit 124 between two or more technologies selected for modernization. The identified technology stacks are assembled as modernization sequence for modernization of two or more technologies of an application selected for modernization and the modernization sequence relates to the MAK and further renders information regarding missing migration dependencies.

Further, the sequence computation unit 124 is configured to evaluate the modernization sequence of the two or more technologies included in the modernization requests. In an embodiment of the present invention, evaluating the modernization sequence of the two or more technologies comprises deriving the hierarchy between each of the technology stacks corresponding to the two or more technologies selected for modernization using the hierarchy database 122. Further, evaluating the modernization sequence comprises arranging technology stacks corresponding to the selected two or more technologies in a chronological order based on the derived hierarchy. The chronological order of the technology stacks corresponding to the two or more technologies selected for modernization is indicative of the modernization sequence of said two or more technologies.

Example: Assuming, application architecture, programming language and Operating System (OS) are the three technologies selected for modernization as per the modernization request. Accordingly, the sequence computation unit 124 derives the hierarchy between each of the technology stacks corresponding to the aforementioned technologies selected for modernization using the hierarchy database 122. In particular, the hierarchy between application architecture stack in relation to programming language stack and OS stack is derived. Further, the hierarchy between OS stack in relation to application architecture stack and programming language stack is derived. Yet further, the hierarchy between programming language stack in relation to the OS stack and application architecture may be derived. Assuming, OS stack is identified as a predecessor of programming language stack and the architecture stack. Further assuming, that the application architecture stack is identified as successor of OS stack and the programming language stack. Yet further, assuming that the programming language stack is identified as successor of OS stack, and predecessor of application architecture. Subsequently, the sequence computation unit 124 arranges the application architecture stack, the OS stack and the programming language stack corresponding to the selected technologies, i.e., application architecture, OS, and the programming language in a chronological order based on the derived hierarchy. The chronological order of the technology stacks is indicative of the modernization sequence of the corresponding two or more technologies. Assuming, that the chronological order is OS stack, programming language stack and then the application architecture stack, accordingly, the modernization sequence indicates that OS is to be modernized first, then the programming language, and finally the application architecture.

In an embodiment of the present invention, the sequence computation unit 124 is configured to generate recommendations associated with technologies that may be optionally removed from the sequence. For example, the modernization request may include a primary focus technology, along with other mandatory technologies selected to facilitate modernization of primary technology. Further, there may be other non-mandatory technologies that are selected for modernization which may have no effect on the modernization of the primary technology. In the aforementioned scenario, the sequence computation unit 124 is configured to generate recommendations indicating the technologies that do not affect the primary technology, and thereby may be removed from the evaluated modernization sequence if desired by an end-user. In another embodiment of the present invention, the sequence computation unit 124 is configured to determine the technologies (such as, mandatory technologies) in the event the technologies are removed from the sequence for application technology modernization.

Advantageously, the system of the present invention affords a technical effect in the field of application modernization by enabling automated evaluation of modernization sequence. In particular, the system of the present invention affords real-time evaluation of an optimal sequence for implementing modernization of multiple technologies associated with an application, thereby significantly reducing modernization time by preventing rework and increasing modernization efficiency. Further, the system of the present invention enables dynamic update of the modernization sequence each time one or more technologies selected for modernization are added/removed from the selection. Yet further, the system of the present invention, eliminates the need of multiple solution architects and their technical expertise related to modernization sequence, thereby eliminating handoffs between various technical experts involved in the generation of modernization sequence. Yet further, the system of the present invention affords efficiency along with ease of usability.

Figure 2:
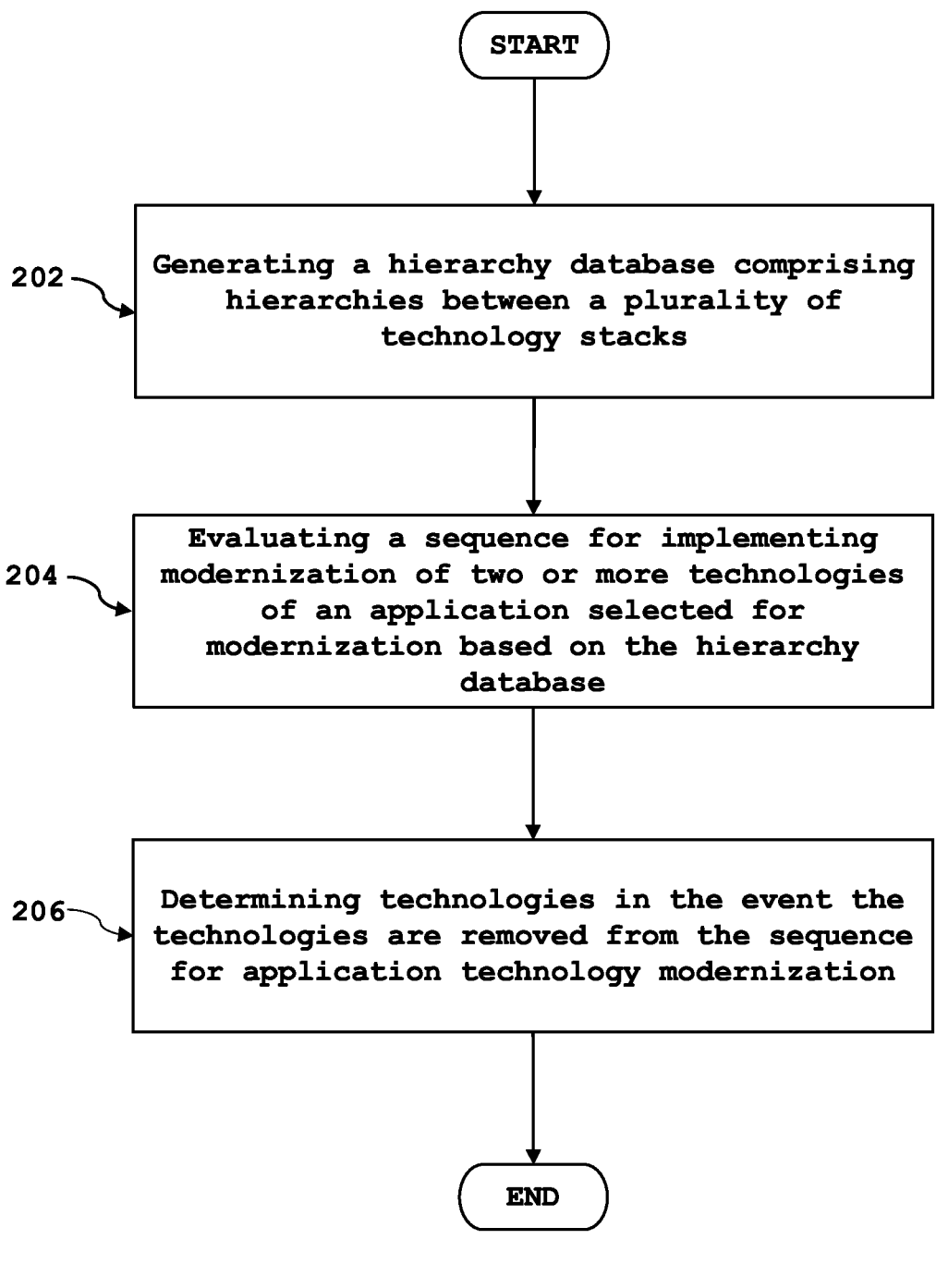
FIG. 2 is a flowchart illustrating a method for generating a modernization sequence for application modernization, in accordance with various embodiments of the present invention.

Referring to FIG. 2, a flowchart of a method for generating a modernization sequence for application modernization is shown, in accordance with various embodiments of the present invention.

At step 202, a hierarchy database is generated. In an embodiment of the present invention a hierarchy database comprising hierarchies between a plurality of technology stacks is generated based on analysis of historic modernization data or user inputs or a combination thereof. The plurality of technology stacks are the stacks most used for building, deploying, and maintaining most of the applications. For example, OS technology stack includes plurality of OS versions, such as Windows®, Linux®, Unix®, etc.; programming language stack, includes a plurality of programming languages, such as .NET®, JAVA®, COBOL®, etc.; database stack includes a plurality of databases, such as MySQL, SQL Server, MongoDB, Oracle Database, PostgreSQL, Informix, Sybase etc.; middleware stack includes a plurality of middleware; run time stack; file system stack, etc.

In operation, historical data is retrieved from external resources (not shown), such as a storage. In an embodiment of the present invention, the historical data is related to modernization sequence used for implementing modernization of various technologies associated with various applications in the past. The historical data is analyzed using one or more data analysis techniques and extract a plurality of sequences related to implementation of modernization of various technologies. Further, the hierarchies between a plurality of technology stacks corresponding to the various technologies are identified based on the extracted sequences. In an embodiment of the present invention, the hierarchies include predecessor, successor, and sibling levels between each tech stack in relation to other of the plurality of tech stacks. The hierarchy level predecessor is representative that the tech stack marked as predecessor should be implemented prior to the other tech stack being compared with. The hierarchy level successor is representative that the tech stack marked as successor should be implemented after the other tech stack being compared with. The hierarchy level sibling is indicative that the tech stacks being compared are at the same level and may be implemented in any sequence.

Yet further, a hierarchy database comprising the identified hierarchies between a plurality of technology stacks is generated. For example: assuming A, B, C, D, E are 5 technology stacks, A is identified as predecessor of B, accordingly, B is the successor of A; D is identified as predecessor of A, accordingly A is successor of D; B and C are identified as siblings, therefore A is identified as predecessor of C, and D is identified as predecessor of A, B and C; A is identified as predecessor of E, accordingly E is successor of A; however, D is identified as predecessor of A, and A is predecessor of E, accordingly E is identified as successor of D.

In an embodiment of the present invention, the identified hierarchies are validated based on user inputs, and the identified hierarchies are modified if required. In another embodiment of the present invention, a hierarchy database is generated based on user inputs that define hierarchies between a plurality of technology stacks.

At step 204, a sequence for implementing modernization of two or more technologies of an application selected for modernization is evaluated based on the hierarchy database. In an embodiment of the present invention, a sequence for implementing modernization of two or more technologies of an application selected for modernization is evaluated in real time. In operation, a modernization request (also referred to as modernization query) is received. In an embodiment of the present invention, the modernization request is received from an application modernization system (102 of FIG. 1) and/or the client computing device (104 of FIG. 1). In an embodiment of the present invention, each modernization request includes information associated with two or more technologies for modernization. The information may include, but is not limited to, name/technical character of the two or more technologies to be modernized or the solutions for implementing the modernization of the two or more technologies, and minimum architecture constraints associated with modernization of the selected two or more technologies. In an embodiment of the present invention, where the information associated with two or more technologies selected for modernization includes the solutions for implementing modernization, therein the name/character of the technologies to be modernized is extracted from the solutions. In an embodiment of the preset invention, sequence order, predecessor, and successor information of the technology stacks are employed to generate the modernization sequence. In an exemplary embodiment of the present invention, two technology stacks may not be compatible, however they may have a predecessor, and successor dependency during modernization, which is carried out based on modernization sequence. In an example, there is no compatibility between the tech stack 'database' and 'scheduler'. However, it is determined that database and programming language migration changes must be completed before scheduler related changes or implementation is carried out. In an exemplary embodiment of the present invention, the modernization request is received comprising a list of selected technology stacks for a MAK along with configuration of minimum architecture constraints required for modernization of technologies. A check is performed for determining missing essential technology stacks. The missing technology stacks are identified between two or more technologies selected for modernization. The identified technology stacks are assembled as modernization sequence for modernization of two or more technologies of an application selected for modernization and the modernization sequence relates to the MAK and further renders information regarding missing migration dependencies.

Further, the modernization sequence of the two or more technologies included in the modernization requests is evaluated. In an embodiment of the present invention, evaluating the modernization sequence of the two or more technologies comprises deriving the hierarchy between each of the technology stacks corresponding to the two or more technologies selected for modernization using the generated hierarchy database. Further, evaluating the modernization sequence comprises arranging the technology stacks corresponding to the selected two or more technologies in a chronological order based on the derived hierarchy. The chronological order of the technology stacks corresponding to the two or more technologies selected for modernization is indicative of the modernization sequence of said two or more technologies.

Example: Assuming, application architecture, programming language and Operating System (OS) are the three technologies selected for modernization as per the modernization request. Accordingly, the hierarchy between each of the technology stacks corresponding to the aforementioned technologies selected for modernization is derived using the hierarchy database. In particular, the hierarchy between application architecture stack in relation to programming language stack and OS stack is derived. Further, the hierarchy between OS stack in relation to application architecture stack and programming language stack is derived. Yet further, the hierarchy between programming language stack in relation to the OS stack and application architecture may be derived. Assuming, OS stack is identified as a predecessor of programming language stack and the architecture stack. Further assuming, that the application architecture stack is identified as successor of OS stack and the programming language stack. Yet further, assuming that the programming language stack is identified as successor of OS stack, and predecessor of application architecture. Subsequently, the application architecture stack, the OS stack and the programming language stack corresponding to the selected technologies, i.e., application architecture, OS, and the programming language are arranged in a chronological order based on the derived hierarchy. The chronological order of the technology stacks is indicative of the modernization sequence of the corresponding two or more technologies. Assuming, that the chronological order is OS stack, Programming language stack and then the application architecture stack, accordingly, the modernization sequence indicates that OS is to be modernized first, then the programming language, and finally the application architecture.

In an embodiment of the present invention, recommendations associated with technologies that may be optionally removed from the sequence are generated based on the analysis of the technology stacks corresponding to said technologies. For example, the modernization request may include a primary focus technology, along with other mandatory technologies selected to facilitate modernization of primary technology. Further, there may be other non-mandatory technologies that are selected for modernization which may have no effect on the modernization of the primary technology. In the aforementioned scenario, recommendations are generated, where the recommendations indicate the technologies that do not affect the primary technology, and thereby may be removed from the evaluated modernization sequence if desired by an end-user. At step 206, the technologies (such as, mandatory technologies) are determined in the event the technologies are removed from the sequence for application technology modernization.

Advantageously, the method of the present invention affords a technical effect in the field of application modernization by enabling automated evaluation of modernization sequence. In particular, the method of the present invention affords real-time evaluation of an optimal sequence for implementing modernization of multiple technologies associated with an application, thereby significantly reducing modernization time by preventing rework and increasing modernization efficiency. Further, the method of the present invention enables dynamic update of the modernization sequence each time one or more technologies selected for modernization are added/removed from the selection. Yet further, the method of the present invention, eliminates the need of multiple solution architects and their technical expertise related to modernization sequence, thereby eliminating handoffs between various technical experts involved in the generation of modernization sequence. Yet further, the method of the present invention affords efficiency along with ease of usability.

Figure 3:
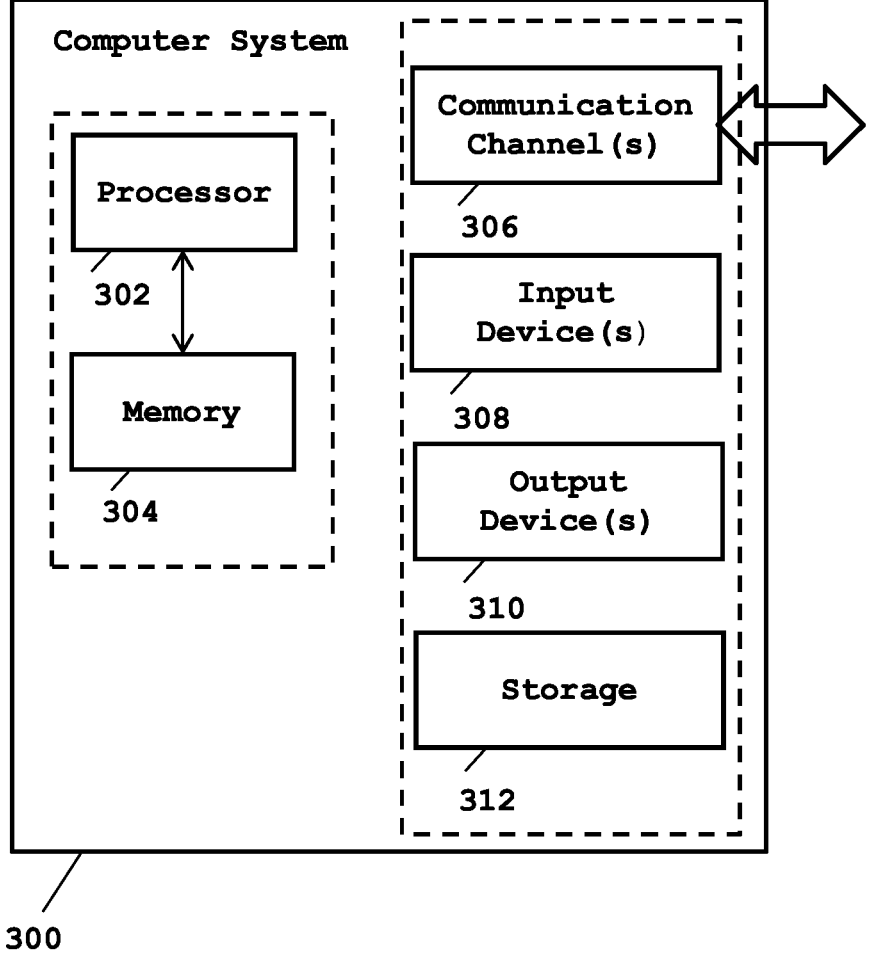
FIG. 3 illustrates an exemplary computer system in which various embodiments of the present invention may be implemented.

FIG. 3 illustrates an exemplary computer system in which various embodiments of the present invention may be implemented.

The computer system 300 comprises a processor 302 and a memory 304. The processor 302 executes program instructions and is a real processor. The computer system 300 is not intended to suggest any limitation as to scope of use or functionality of described embodiments. For example, the computer system 300 may include, but not limited to, a programmed microprocessor, a micro-controller, a peripheral integrated circuit element, and other devices or arrangements of devices that are capable of implementing the steps that constitute the method of the present invention. In an embodiment of the present invention, the memory 306 may store software for implementing various embodiments of the present invention. The computer system 300 may have additional components. For example, the computer system 300 includes one or more communication channels 306, one or more input devices 308, one or more output devices 310, and storage 312. An interconnection mechanism (not shown) such as a bus, controller, or network, interconnects the components of the computer system 300. In various embodiments of the present invention, operating system software (not shown) provides an operating environment for various softwares executing in the computer system 300 and manages different functionalities of the components of the computer system 300.

The communication channel(s) 306 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, Bluetooth, or other transmission media.

The input device(s) 308 may include, but not limited to, a keyboard, mouse, pen, joystick, trackball, a voice device, a scanning device, touch screen or any another device that is capable of providing input to the computer system 300. In an embodiment of the present invention, the input device(s)

308 may be a sound card or similar device that accepts audio input in analog or digital form. The output device(s) 310 may include, but not limited to, a user interface on CRT or LCD, printer, speaker, CD/DVD writer, or any other device that provides output from the computer system 300.

The storage 312 may include, but not limited to, magnetic disks, magnetic tapes, CD-ROMs, CD-RWs, DVDs, flash drives or any other medium which can be used to store information and can be accessed by the computer system 300. In various embodiments of the present invention, the storage 312 contains program instructions for implementing the described embodiments.

The present invention may suitably be embodied as a computer program product for use with the computer system 300. The method described herein is typically implemented as a computer program product, comprising a set of program instructions which is executed by the computer system 300 or any other similar device. The set of program instructions may be a series of computer readable codes stored on a tangible medium, such as a computer readable storage medium (storage 312), for example, diskette, CD-ROM, ROM, flash drives or hard disk, or transmittable to the computer system 300, via a modem or other interface device, over either a tangible medium, including but not limited to optical or analogue communications channel(s) 306. The implementation of the invention as a computer program product may be in an intangible form using wireless techniques, including but not limited to microwave, infrared, Bluetooth, or other transmission techniques. These instructions can be preloaded into a system or recorded on a storage medium such as a CD-ROM or made available for downloading over a network such as the internet or a mobile telephone network. The series of computer readable instructions may embody all or part of the functionality previously described herein.

The present invention may be implemented in numerous ways including as a system, a method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the scope of the invention as defined by the appended claims.

We claim:

1. A method for generating an optimal sequence for implementing modernization of technologies associated with an application, wherein the method is implemented by a processor executing program instructions stored in a memory, the method comprises:

generating, by the processor, a hierarchy database comprising hierarchies between a plurality of technology stacks based on an analysis of historic modernization data and user inputs received from external resources via an integration interface, wherein modernization sequences identifying hierarchies between the technology stacks are extracted;

receiving, by the processor, a modernization request from one or more platforms and computing devices associated with an application modernization system capable of offering application modernization via the integration interface, wherein the integration interface is configured with one or more Application Programming Interfaces (APIs) or a Graphical User Interface (GUI) accessible via a user module; and evaluating, by the processor, subsequent to receiving the modernization request, in real-time an optimal sequence for implementing modernization of two or more technologies associated with the application based on the generated database thereby reducing modernization time by preventing rework and increasing efficiency, wherein a hierarchy between each of the technology stacks corresponding to the two or more technologies is derived based on the database, and the technology stacks are arranged in a chronological order based on the derived hierarchy, and wherein the modernization sequence of the two or more technologies is same as the chronological order of their corresponding technology stacks.

2. The method as claimed in claim 1, wherein the plurality of technology stacks are the stacks commonly used for building, deploying and maintaining any application.

3. The method as claimed in claim 1, wherein the hierarchies include predecessor, successor and sibling levels between each technology stack in relation to other of the plurality of technology stacks.

4. The method as claimed in claim 1, wherein the plurality of technology stacks includes Operating System technology stack, programming language stack, database stack, Middleware stack, run time stack and file system stack.

5. The method as claimed in claim 1, wherein the step of generating the hierarchy database of hierarchies between the plurality of technology stacks based on analysis of historic modernization data comprises:

retrieving historical data from the external resources, wherein the historical data is related to modernization sequences used for implementing modernization of a plurality of technologies associated with various applications in the past;

analyzing the historical data using one or more data analysis techniques for extracting the modernization sequences;

identifying the hierarchies between the plurality of technology stacks corresponding to the plurality technologies based on the extracted sequences; and generating the database comprising the identified hierarchies between the plurality of technology stacks.

6. The method as claimed in claim 5, wherein the identified hierarchies are validated based on user inputs, and the identified hierarchies are modified if required.

7. The method as claimed in claim 1, wherein the modernization request includes information associated with the two or more technologies of the application selected for modernization.

8. The method as claimed in claim 7, wherein the information includes name and/or technical character of the two or more technologies or the solutions for implementing the modernization of the two or more technologies, and minimum architecture constraints associated with modernization of the two or more technologies.

9. The method as claimed in claim 1, wherein recommendations associated with technologies that are optionally removed from the sequence are generated based on the analysis of the technology stacks corresponding to said technologies, and wherein the technologies are determined, in the event the technologies are removed from the sequence for application technology modernization.

10. A system for generating an optimal sequence for implementing modernization of technologies associated with an application, the system comprising:

a memory storing program instructions; a processor configured to execute program instructions stored in the memory; and a sequence generation engine executed by the processor and configured to:

generate a hierarchy database comprising hierarchies between a plurality of technology stacks based on an analysis of historic modernization data and user inputs received from external resources via an integration interface, wherein modernization sequences identifying hierarchies between the technology stacks are extracted;

receive a modernization request from one or more platforms and computing devices associated with an application modernization system capable of offering application modernization via the integration interface, wherein the integration interface is configured with one or more Application Programming Interfaces (APIs) or a Graphical User Interface (GUI) accessible via a user module; and evaluate, subsequent to receiving the modernization request, in real-time an optimal sequence for implementing modernization of two or more technologies associated with the application based on the generated database thereby reducing modernization time by preventing rework and increasing efficiency, wherein a hierarchy between each of the technology stacks corresponding to the two or more technologies is derived based on the database, and the technology stacks are arranged in a chronological order based on the derived hierarchy, and wherein the modernization sequence of the two or more technologies is same as the chronological order of their corresponding technology stacks.

11. The system as claimed in claim 10, wherein the plurality of technology stacks are the stacks commonly used for building, deploying and maintaining any application.

12. The system as claimed in claim 10, wherein the hierarchies include predecessor, successor and sibling levels between each technology stack in relation to other of the plurality of technology stacks.

13. The system as claimed in claim 10, wherein the plurality of technology stacks includes Operating System technology stack, programming language stack, database stack, Middleware stack, run time stack and file system stack.

14. The system as claimed in claim 10, wherein the sequence generation engine executed by the processor generates the hierarchy database by:

retrieving historical data from the external resources, wherein the historical data is related to modernization sequences used for implementing modernization of a plurality of technologies associated with various applications in the past;

analyzing the historical data using one or more data analysis techniques and for extracting the modernization sequences;

identifying the hierarchies between the plurality of technology stacks corresponding to the plurality technologies based on the extracted sequences; and generating the hierarchy database comprising the identified hierarchies between the plurality of technology stacks.

15. The system as claimed in claim 14, wherein the identified hierarchies are validated based on user inputs, and the identified hierarchies are modified if required.

16. The system as claimed in claim 10, wherein the modernization request includes information associated with the two or more technologies of the application selected for modernization.

17. The system as claimed in claim 16, wherein the information includes name and/or technical character of the two or more technologies or the solutions for implementing the modernization of the two or more technologies, and minimum architecture constraints associated with modernization of the two or more technologies.

18. The system as claimed in claim 10, wherein recommendations associated with technologies that are optionally removed from the sequence are generated based on the analysis of the technology stacks corresponding to said technologies, and wherein the technologies are determined, in the event the technologies are removed from the sequence for application technology modernization.

19. A computer program product comprising:

a non-transitory computer-readable medium having computer-readable program code stored thereon, the computer-readable program code comprising instructions that, when executed by a processor, causes the processor to:

generate a hierarchy database comprising hierarchies between a plurality of technology stacks based on an analysis of historic modernization data and user inputs received from external resources via an integration interface, wherein modernization sequences identifying hierarchies between the technology stacks are extracted;

receive a modernization request from one or more platforms and computing devices associated with an application modernization system capable of offering application modernization via the integration interface, wherein the integration interface is configured with one or more Application Programming Interfaces (APIs) or a Graphical User Interface (GUI) accessible via a user module; and evaluate, subsequent to receiving the modernization request, in real time an optimal sequence for implementing modernization of two or more technologies associated with the application based on the generated database thereby reducing modernization time by preventing rework and increasing efficiency, wherein a hierarchy between each of the technology stacks corresponding to the two or more technologies is derived based on the database, and the technology stacks are arranged in a chronological order based on the derived hierarchy, and wherein the modernization sequence of the two or more technologies is same as the chronological order of their corresponding technology stacks.

* * * * *